US012771590B1

(12) United States Patent
Azizoglu

(10) Patent No.: US 12,771,590 B1
(45) Date of Patent: Oct. 20, 2026

(54) BIT MAPPING SYSTEMS AND METHODS FOR ERROR CORRECTING CODES WITH HIGH ORDER MODULATION

(71) Applicant: Cisco Technology, Inc., San Jose, CA (US)

(72) Inventor: Murat Azizoglu, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/606,328

(22) Filed: Mar. 15, 2024

Related U.S. Application Data

(60) Provisional application No. 63/452,836, filed on Mar. 17, 2023.

(51) Int. Cl.
*H04L 27/34* (2006.01)

(52) U.S. Cl.
CPC ................................ *H04L 27/3405* (2013.01)

(58) Field of Classification Search
CPC .................................................. H04L 27/3405
See application file for complete search history.

(56) References Cited

U.S. PATENT DOCUMENTS

| | | | | |
|---|---|---|---|---|
| 7,516,390 B2 * | 4/2009 | Shen | H03M 13/6362 | 714/755 |
| 7,577,207 B2 * | 8/2009 | Eroz | H04L 27/2053 | 375/261 |
| 8,190,981 B2 * | 5/2012 | Jeong | H04L 27/38 | 714/751 |
| 11,722,155 B2 * | 8/2023 | Park | H03M 13/2792 | 714/758 |
| 2005/0216821 A1 * | 9/2005 | Harada | H04L 27/183 | 714/801 |
| 2006/0013181 A1 * | 1/2006 | Stolpman | H03M 13/353 | 370/441 |

* cited by examiner

*Primary Examiner* — Freshteh N Aghdam
(74) *Attorney, Agent, or Firm* — Patterson + Sheridan, LLP

(57) ABSTRACT

In part, the disclosure relates to a method for bit mapping codes. The method may include providing a modulator with n modulation classes; receiving a code defined at least in part by at least two types of degree bit classes, a high quality degree class, Y intermediate quality degree classes and a low quality degree class, wherein Y is 0 or a positive integer; assigning the high quality degree bits, the intermediate quality degree bits, and the low quality degree bits to the n modulation classes; generating, using the modulator, a modulated waveform; and transmitting the modulated waveform.

19 Claims, 7 Drawing Sheets

| Modulation | Modulation classes (m) | Class Size |
|---|---|---|
| QPSK | 1 | X |
| 16-QAM | 2 | X/2 |
| 64-QAM | 3 | X/3 |
| 256-QAM | 4 | X/4 |
| 1024-QAM | 5 | X/5 |
| 4096-QAM | 6 | X/6 |

BIT MAPPING SYSTEMS AND METHODS FOR ERROR CORRECTING CODES WITH HIGH ORDER MODULATION

CROSS REFERENCE TO RELATED APPLICATIONS

This application claims priority to and the benefit of U.S. Provisional Patent Application No. 63/452,836 filed on Mar. 17, 2023, the disclosure of which is herein incorporated by reference in its entirety.

BACKGROUND

Contemporary communications systems make extensive use of various error correcting codes for various purposes.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

OVERVIEW

In part, in one aspect, the disclosure relates to a method for bit mapping codes. The method may include providing a modulator with n modulation classes; receiving a code defined at least in part by at least two types of degree bit classes, a high quality degree class, Y intermediate quality degree classes and a low quality degree class, wherein Y is 0 or a positive integer; assigning the high quality degree bits, the intermediate quality degree bits, and the low quality degree bits to the n modulation classes; generating, using the modulator, a modulated waveform; and transmitting the modulated waveform.

In part, in another aspect, the disclosure relates to a method for allocating different quality degree bits to different quality modulation bits. The method may include providing a mapping of a 16-QAM code word wherein the mapping has two different modulation classes, a plurality of amplitude modulation bits and a plurality of sign modulation bits wherein the sign modulation bits are less likely to be in error than the amplitude modulation bits; providing a code having a plurality of degree-2 bits, a plurality of degree-3 bits and a plurality of degree-10 bits; mapping the degree-10 bits to the amplitude modulation bits; mapping the degree-2 bits to the sign modulation bits; and mapping the degree-3 bits to a plurality of remaining modulation bits. In many embodiments, one or more parity check bits occupy the lowest degree class that are assigned to the sign modulation bits.

EXEMPLARY EMBODIMENTS

Increasing demand for higher communication speeds has accelerated the use of high order modulation formats in optical communication systems. With such high order modulation, a group of bits are mapped into a symbol which is then transmitted by using the amplitude and the phase of a sinusoidal carrier wave at optical frequencies. The use of such modulation formats often uses error correction methodologies such as the use of error correction codes that may be used to correct bit errors caused by channel impairments such as noise, intersymbol interference, chromatic dispersion, crosstalk, and others. Different types of error correction codes, such as forward error correction (FEC) codes may provide different levels of error correction to different bits within the encoded bit stream. Irregular Low Density Parity Check (LDPC) codes are examples of such codes. The present disclosure provides various systems, methods and architectures to improve performance of data encoding and modulation.

Figure 1A:
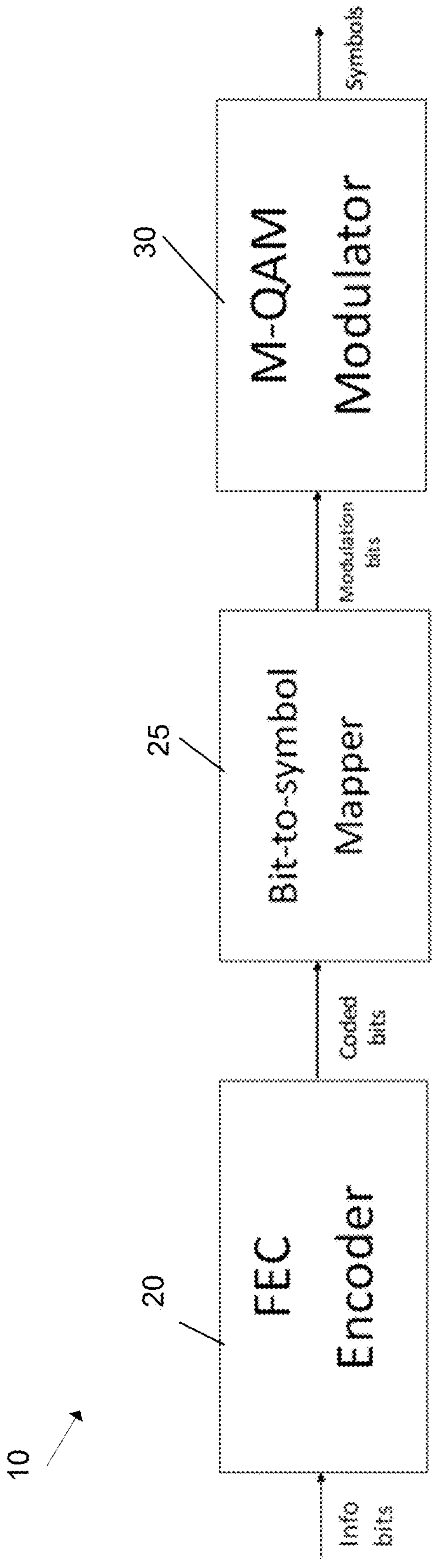
FIG. 1A is an exemplary encoding and modulation system suitable for use in an electro-optical transmitter and other devices and for which an improved bitmapping-based modulation scheme may be implemented according to an exemplary embodiment of the disclosure.

In various embodiments, the features of the disclosure may be implemented using various architectures and systems such as the generalized coding/modulation system 10 shown in FIG. 1A which may be used in various electro-optical transmitters. The information bits are encoded by an encoder 20 that adds error correction redundancy (parity bits) to produce coded bits. In some embodiments, the encoder 20 is a FEC encoder. In turn, the coded bits are mapped to symbols by using a bit-to-symbol mapper. The mapper 25 is configured to generate modulation bits from the coded bits from encoder 20. In some embodiments, when all coded bits are of uniform characteristics, the mapper 25 will take a small group of m consecutive bits and map them into one of M=2m symbols that typically lie in a one- or two-dimensional signal space.

In various embodiments, a small group of m consecutive bits are modulation bits that may be operated upon by a modulator such as the exemplary M-QAM modulator 30, which may use various m values for a given modulation scheme. For example, the value of m is 2 for Quaternary Phase Shift Keying (QPSK) modulation, m=3 for 8-ary Pulse Amplitude Modulation (8-PAM), m=4 for 16-ary Quadrature Amplitude Modulation (16-QAM), m=6 for 64-QAM, and so on. In some circumstances during the encoding and modulation operations of a given transmitter, when not all coded bits are of uniform reliability, an advantageous and somewhat counterintuitive mapping scheme may be used to improve the overall system performance without significantly increasing costs. In various embodiments, the mapper 25 is a bit-to-symbol mapper.

In various embodiments, the mapping scheme takes the bits from the encoder with the highest associated error rate and interleaves, shuffles, or otherwise maps them to symbols with positions or modulation classes that have the lowest error rate relative to the other positions or modulation classes. In many embodiments, the mapping also takes the bits from the encoder with the lowest associated error rate and interleaves, shuffles, or otherwise maps them to symbols with positions or modulation classes that have the highest error rate relative to the other positions or modulation classes. In some embodiments, the data being modulated with a high error or low error rate is effectively mapped according to the parts of the optical signal that have the opposite error rate. Various encoders, decoders, and interleavers may be used. In an indirect reference to the specific FEC codes that might be irregular LDPC codes, coded bit classes having different error rate characteristics may be referenced as "degree classes" herein.

In part, in one aspect, the disclosure relates to a method of mapping bits to symbols via a modulation scheme wherein the symbols are transmitted over a communications channel. In one aspect, during mapping of bits to symbols, the method exploits asymmetry in bit qualities in a given block of bits coded by a particular code. In some embodiments, the code is a low-density parity check (LDPC). In some embodiments, the code may be an irregular LDPC code. The asymmetry in bit qualities may be due to different degree classes of the code. In part, the method improves the overall performance in both forward error correction (FEC) threshold and in convergence speed of the iterative decoder such as an LDPC decoder.

In part, the method disclosed herein is applicable to high-order modulation formats such as M-ary QAM with $M=2^m$ symbols where m>2. In M-QAM with even exponent m, to reduce a number of bits likely to be in error due to channel impairments, i.e. when a transmitted symbol is erroneously received and decoded as an adjacent symbol in a constellation, Gray mapping supports adjacent symbols differing only in a single bit position. The present disclosure takes advantage of asymmetry in bit qualities, e.g. as encountered in an irregular LDPC code, so that the combined performance is improved over bit-interleaved Gray mapping. The method disclosed herein achieves this by prescribing which code word bits go into which bit positions within a mapping such as the Gray map.

The present disclosure relates to the design, creation, and/or implementation of a method of mapping coded bits, e.g. by an irregular low density parity check (LDPC) code, to symbols in a high order modulation format, such as M-ary QAM with $M=2^m$ symbols where m>2. In many embodiments, the present disclosure takes advantage of different degree classes, corresponding to different nodal degrees in a graph such as the Tanner graph, of a code such as an irregular LDPC code to improve overall performance both in forward error correction (FEC) threshold and in the convergence speed of the iterative LDPC decoder. The present disclosure achieves this through a code and a mapping scheme, such as a bit mapping scheme, instead of employing multiple codes for multiple modulation classes as in a multi-level code that makes implementation impractical for most applications. Further, the present disclosure does not require additional storage, computation, or hardware beyond the FEC encoder/decoder due to the mapping scheme. Although reference is made to a LDPC encoder and LDPC codes including irregular codes, various encoders and code types may be used in different embodiments.

In many embodiments, a transceiver utilizing an M-QAM modulation format with $M=2^{2n}$ symbols and an irregular LDPC encoder for FEC has two levels of hierarchy in bit quality. One level of the hierarchy is the difference in quality between the n distinct modulation classes in the modulation bits (the bits corresponding to a given symbol). For example, for $M=2^{2\cdot 2}=16$ QAM, there are n=2 modulation classes: sign bits (the two most significant bits) and amplitude bits (the two least significant bits), where sign bits are of higher reliability than amplitude bits as sign bits are likely to be identical between symbols adjacent in a constellation. An $M=2^{2\cdot 3}=64$ QAM modulation format has n=3 modulation classes: sign bits and two classes of amplitude bits, where sign bits are of higher quality than amplitude bits and one of the amplitude classes is of higher quality than the other. The other level of the bit quality hierarchy is in the difference in quality between the distinct degree classes of the irregular LDPC code. Higher degree nodes in the Tanner graph associated with the LDPC code are less likely to be in error (they appear in more parity checks) and also converge more quickly when an iterative decoder is used (as their associated graph nodes receive a greater amount of updated information in each decoder iteration). The present disclosure takes advantage of this two-level hierarchy by mapping coded bits to symbols in the modulation format such that low degree/quality FEC (LDPC) bits are mapped into high quality modulation classes. Conversely, high degree/quality FEC (LDPC) bits which are highly likely to be decoded correctly by the LDPC encoder are mapped into low quality modulation classes.

Bit Modulation Classes.

In high order modulation formats, when a symbol is transmitted and the received signal is closer to another symbol, one or more of the m bits associated with the transmitted symbol will be in error at the FEC decoder input. In various embodiments, a Gray mapping may be employed which ensures that neighboring symbols are assigned bits that differ in a single bit position.

Figures 1B, 1C:
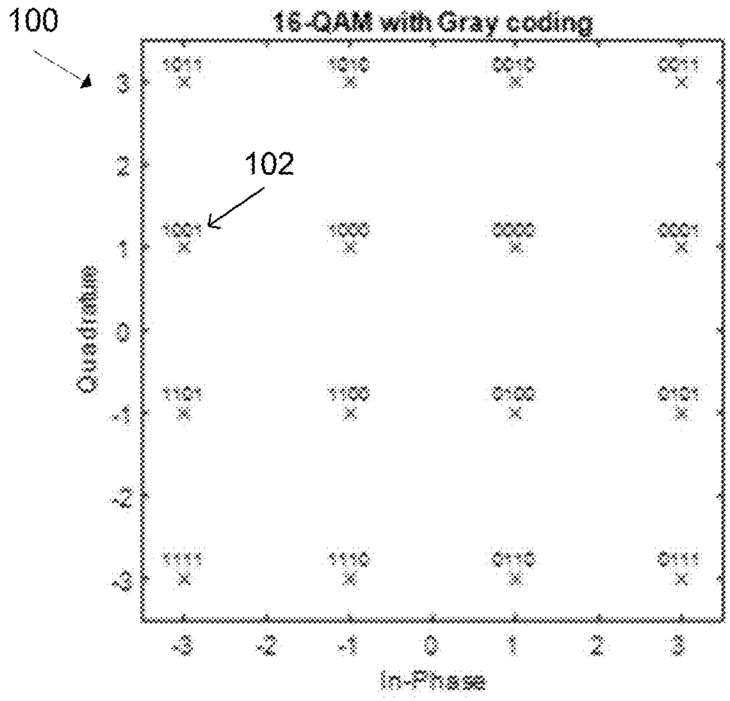
FIG. 1B is a 16-QAM constellation diagram with Gray mapping according to an exemplary embodiment of the disclosure.
FIG. 1C is a table indicating the number of modulation classes and the proportional modulation class sizes for different modulation formats according to an exemplary embodiment of the disclosure.

Refer now to the example embodiment of FIG. 1B which shows a 16-QAM constellation diagram 100 with Gray mapping. The Gray mapping ensures that each neighboring symbol is assigned bits that differ in a single bit position. This is desirable as it reduces errors at the FEC decoder input. In various embodiments, not all bits of a given constellation in a Gray mapping are of the same quality. In various embodiments, there are different modulation classes in a given Gray mapping. In various embodiments, there are n modulation classes for a $2^{2n}$-QAM constellation Gray mapping. In various embodiments, a 16-QAM constellation Gray mapping has two bit modulation classes. In various embodiments, the two-bit modulation classes are a sign bit modulation class and an amplitude bit modulation class. In various embodiments, the sign bit modulation class is less likely to be in error than the amplitude bit modulation class. In various embodiments, it is unlikely for more than one bit to be in error. In various embodiments, because it is unlikely for more than one bit to be in error, bit neighbor errors are more likely than other bit errors.

In FIG. 1B, an example constellation diagram 100 showing a point (symbol) 102 that is mapped to the bit sequence 1001 for 16-QAM (M=16) modulation with Gray coding. As shown, point 102 is a point on the edge of the constellation diagram corresponding to a quadrature value of 1 (y-axis) and in-phase value of −3 (x-axis) in constellation diagram 100. In various embodiments, the two most significant bits are sign bits. In various embodiments, the least significant two bits are amplitude bits.

For the example constellation point (symbol) 102, at (−3, 1), the sign bits are 1 and 0 and the amplitude bits are 0 and 1. For the example constellation point (symbol) 102, the most likely bit errors would be one of the neighboring constellation points. In various embodiments, for the Gray mapping of the example constellation point (symbol) 102, the most likely bit errors would result as 1000, 1011, or 1101. The applicant appreciates that the example constellation point (symbol) 102 is likely to have three bit errors in the amplitude bits, and one bit error in a sign bit. In various embodiments, there are fewer possible neighbor sign bit errors than neighbor amplitude bit errors that can occur in a Gray mapping. This means that in various embodiments, the sign bits of a 16-QAM constellation are less likely to be in error than the amplitude bits. The foregoing may be extended to 64-QAM and other QAM and other modulation and multiplexing schemes.

In various embodiments, a 64-QAM mapping has three-bit modulation classes. In various embodiments, the three bit modulation classes are a sign class, a first amplitude class, and a second amplitude class. In various embodiments, the sign class is made up of the most significant bits, the first amplitude class is made up of the moderately significant bits, and the second amplitude class is made up of the least significant bits.

In various embodiments, with 64-QAM, there are fewer possible neighbor sign bit errors than neighbor first amplitude bit errors that can occur in a Gray mapping. In various embodiments, there are fewer possible first amplitude bit errors than second amplitude bit errors that can occur in a Gray mapping. In various embodiments, the sign bit modulation class is more reliable than the first amplitude bit modulation classes, and the first amplitude bit modulation class is more reliable than the second amplitude bit modulation class.

Refer now to the example embodiment of FIG. 1C, which shows the number of modulation bit classes and the size of those classes for different modulations. These modulation classes may be matched with bits such that a modulation class with a high error rate is matched to a degree bit with a low error rate and vice versa. In various embodiments, the different reliability of the modulation bit classes exists for M-ary QAM where $M=2^{2n}$ and n is the number of modulation bit classes that contain an equal number of bits. In various embodiments, if M=22n+1, there are n+ modulation bit classes. In various embodiments, a QPSK (4-QAM) modulation has one modulation bit class, made up of X bits. In various embodiments, a 16-QAM modulation has 2 evenly sized modulation bit classes. In various embodiments, a 64-QAM modulation has 3 evenly sized modulation bit classes. In various embodiments, a 256-QAM modulation has 4 evenly sized modulation bit classes. In various embodiments, a 1024-QAM modulation has 5 evenly sized modulation bit classes. In various embodiments, a 4096-QAM has 6 evenly sized modulation bit classes. In various embodiments, the raw Bit Error Rate (BER) approximately doubles moving from the most significant bit class to the next most significant bit class, doubles yet again for the third most significant modulation bit class, and so on.

Degree Bit Classes.

In some embodiments, irregular LDPC codes and other codes with similar properties are selected because they provide for additional improvement due to their non-uniform error rate properties. Irregular LDPC codes involve different bits within the same block which have non-uniform characteristics by design. In various embodiments, an irregular LDPC code may have a small number of degree bit classes. In various embodiments, the irregular LDPC code may have 2 or 3 degree bit classes, each with a different nodal degree in an associated Tanner graph. In various embodiments, the irregular LDPC code may have 4 or more degree bit classes, each with a different degree in an associated Tanner graph. In various embodiments, irregular LDPC codes are decoded by iterative Belief Propagation (BP) decoders that exchange beliefs between various nodes in the Tanner graph. In various embodiments, iterative BP decoders observe high degree bit classes converge faster with much fewer errors and higher levels of confidence (higher output log-likelihood ratios).

Figure 2A:
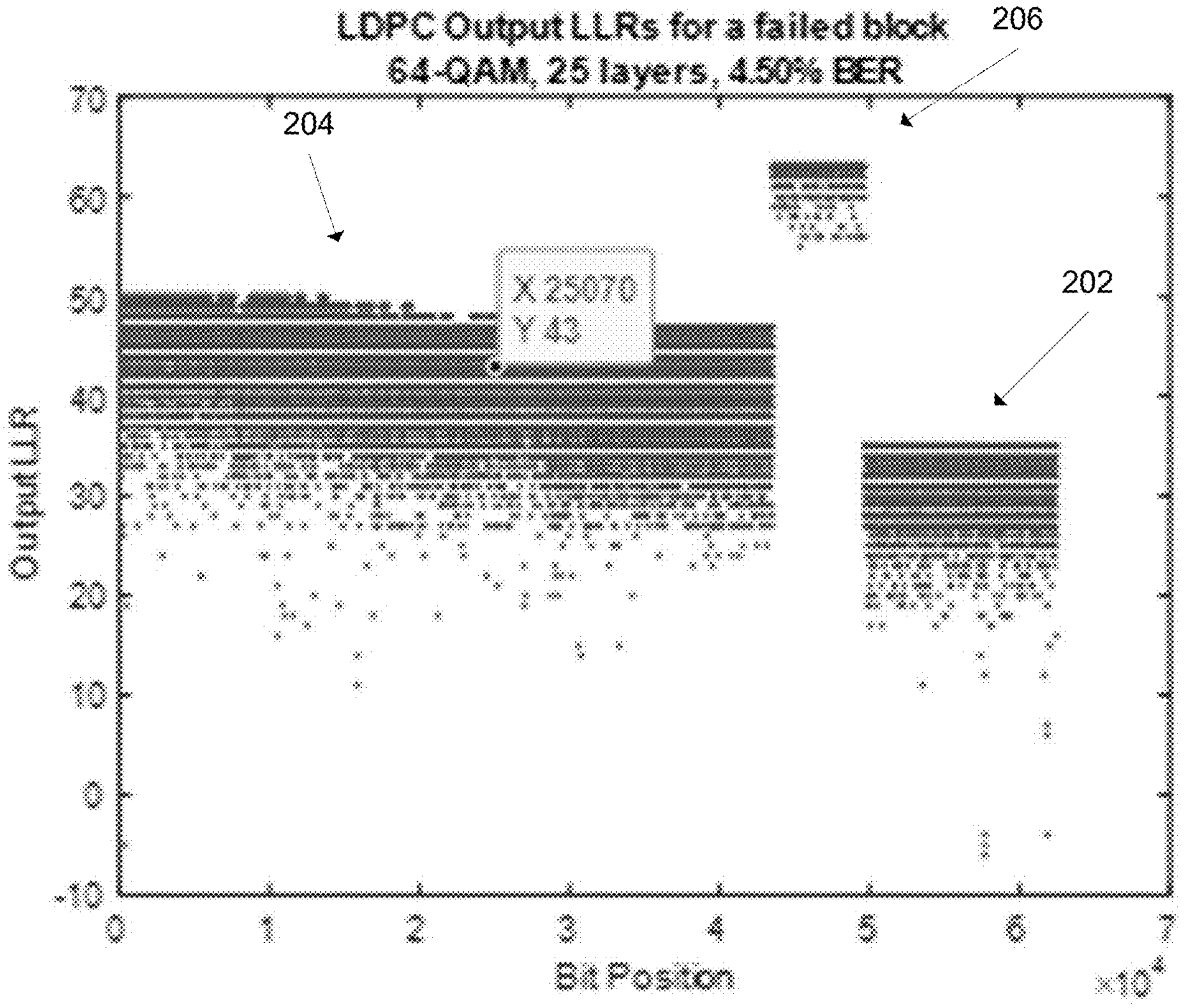
FIG. 2A is a graph depicting the LLR values at the decoder output for different bit positions in an LDPC codeword using 64-QAM modulation according to an exemplary embodiment of the disclosure.

Refer now to FIG. 2A which illustrates the difference in bit quality for an LDPC code with degree classes {2, 3, 10}. FIG. 2A is a plot of the log-likelihood ratio (LLR) versus bit position in a failed block transmitted using a 64-QAM modulation format at a channel bit error rate (BER) of 4.50%. The higher the LLR, the more certainty there is surrounding the bit. If the LLR is negative, the bit is considered in error. The degree-2 bits 202 are from position 49665 to 62464. In various embodiments, the degree-2 bits 202 are the lowest quality or least reliable bits. In various embodiments, the degree-2 bits may carry the parity check bits of an LDPC codeword.

FIG. 2A shows a number of degree-2 bits in error. The bits positioned from position 1 to 43520 are degree-3 bits 204. FIG. 2A shows no degree-3 bits 204 in error. In various embodiments, the degree-3 bits 204 are more reliable than the degree-2 bits 202. The degree-10 bits 206 are from position 43512 to 49664. In various embodiments, the degree-10 bits 206 are the most reliable. In various embodiments, the degree-10 bits 206 constitute a minority of bits in the codeword. FIG. 2A shows no degree-10 bits 206 in error. The degree-10 bits 206 exhibit very high LLR.

Figure 2B:
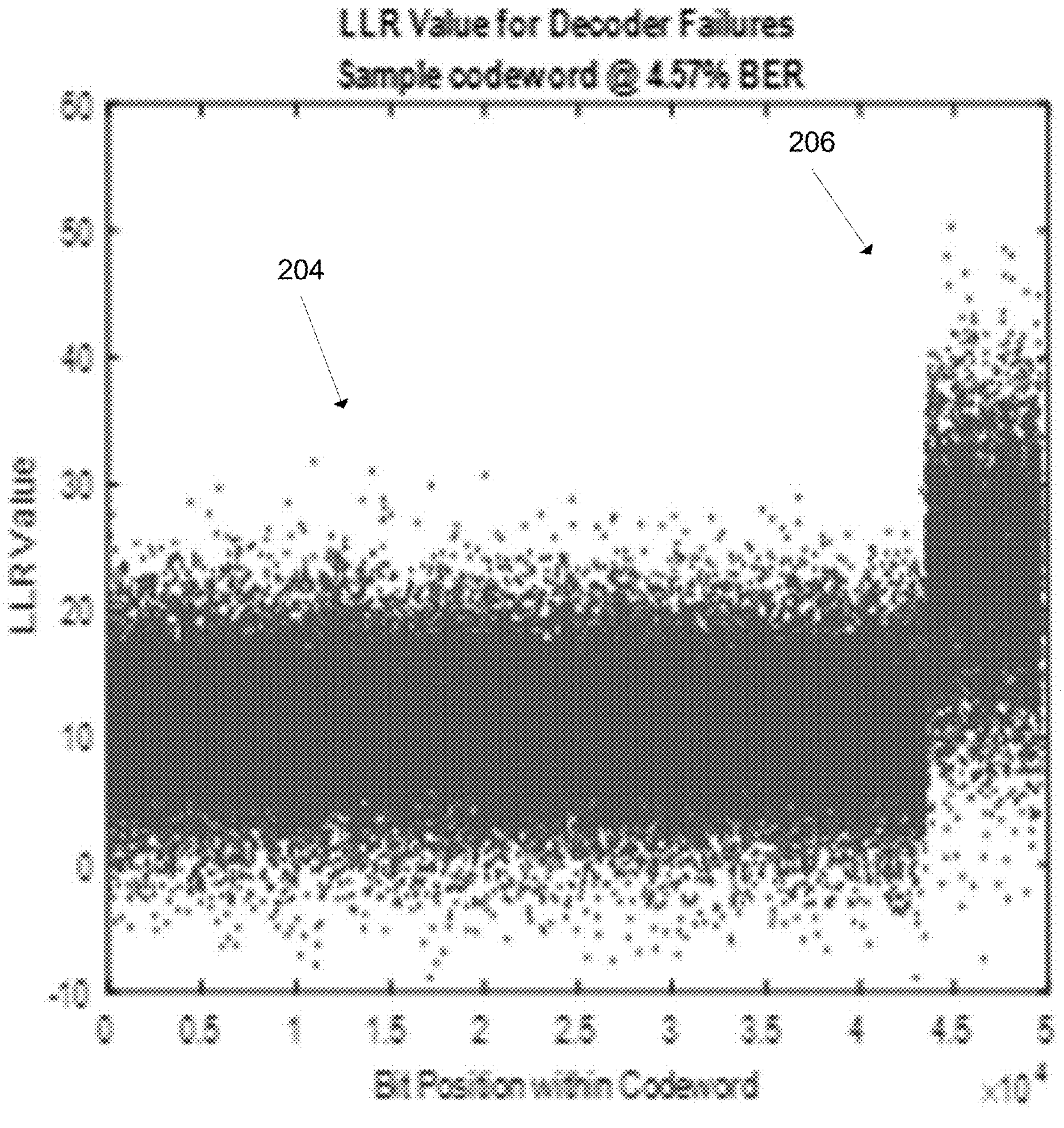
FIG. 2B is a graph representing the LLR values at the decoder output for different information bit positions in an LDPC codeword using QPSK modulation according to an exemplary embodiment of the disclosure.

Refer now to the example embodiment of FIG. 2B which illustrates log-likelihood ratios for bits in a failed LDPC codeword modulated with a QPSK scheme and where the channel bit error rate is 4.57%. The higher the LLR, the more certainty there is surrounding the bit. If the LLR is negative, the bit is considered in error. The degree-3 bits 204 are positioned from position 1 to 43520. In FIG. 2B, many of the degree-3 bits 204 are in error. The degree-10 bits 206 are from position 43512 to 49664. In FIG. 2B, very few of the degree-10 bits are in error.

Mapping of Degree Classes to Bit Modulation Classes.

In most embodiments, each modulation class in the modulation format has the same number of bits, while, in general, degree classes in an irregular LDPC code have different numbers of bits. As such, each modulation class will not necessarily be populated by an equal number of bits of a given LDPC degree class. In many embodiments of the current disclosure, the distribution of coded bits into modulation classes proceeds according to a water-filling algorithm.

In one embodiment, the bit-to-symbol mapping method disclosed herein may be realized in a 16-QAM modulation format. Consider an irregular LDPC code with degree classes {2, 3, 10} having cardinalities {24, 84, 12}. In a 16-QAM format there are 2 modulation classes, sign bits and the amplitude bits. In various embodiments, for some integer Q, total of 120Q bits in the FEC block are mapped to 60Q sign bits and 60Q amplitude bits in the 16-QAM format. In the LDPC code under consideration, there are 24Q degree-2 bits, 84Q degree-3 bits, and 12Q degree 10 bits. In some embodiments, when Q=512, the code block size is 120Q=61440. In various embodiments, the 24Q degree-2 bits may be mapped to 24Q of the 60Q sign bits which are the most reliable modulation bits. In various embodiments, the parity bits in the LDPC codeword may be within the 24Q degree-2 bits. In various embodiments, the 360 degree-3 bits are mapped to the remaining 36Q of the 60Q sign bits. In various embodiments, the 12Q degree-10 bits are assigned to 12Q of the 60Q amplitude bits. In various embodiments, the remaining 48Q bits of the 84Q degree-3 bits are assigned to the 48Q remaining amplitude bits.

In one embodiment, the bit-to-symbol mapping method disclosed herein may be realized in a 64-QAM modulation format. In various embodiments, the three modulation classes are a sign modulation class, a first amplitude modulation class, and a second amplitude modulation class. Each modulation class would require 40Q bits. The sign class (having the most significant bits in the Gray mapping) would be assigned 24Q degree-2 bits and 16Q degree 3-bits. The second amplitude class (having the least significant bits in the Gray mapping) would be assigned 12Q degree-10 bits and 28Q degree-3 bits. The first amplitude class (having the medium significant bits in the Gray mapping) is assigned the remaining 40Q degree-3 bits. In various embodiments, degree-2 bits comprise the parity check bits of the underlying LDPC code.

Figure 3A:
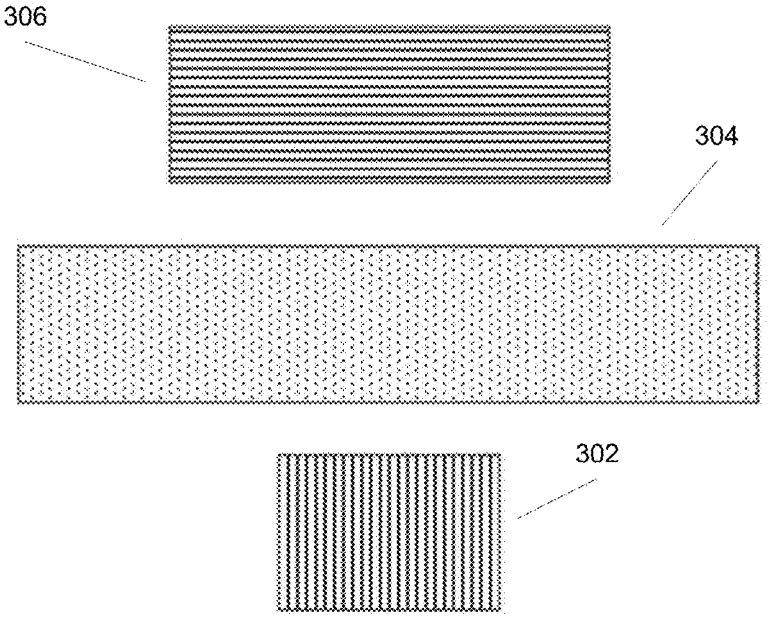
FIG. 3A depicts the proportions of degree bit types in accordance with an exemplary embodiment of the disclosure.
Figure 3B:
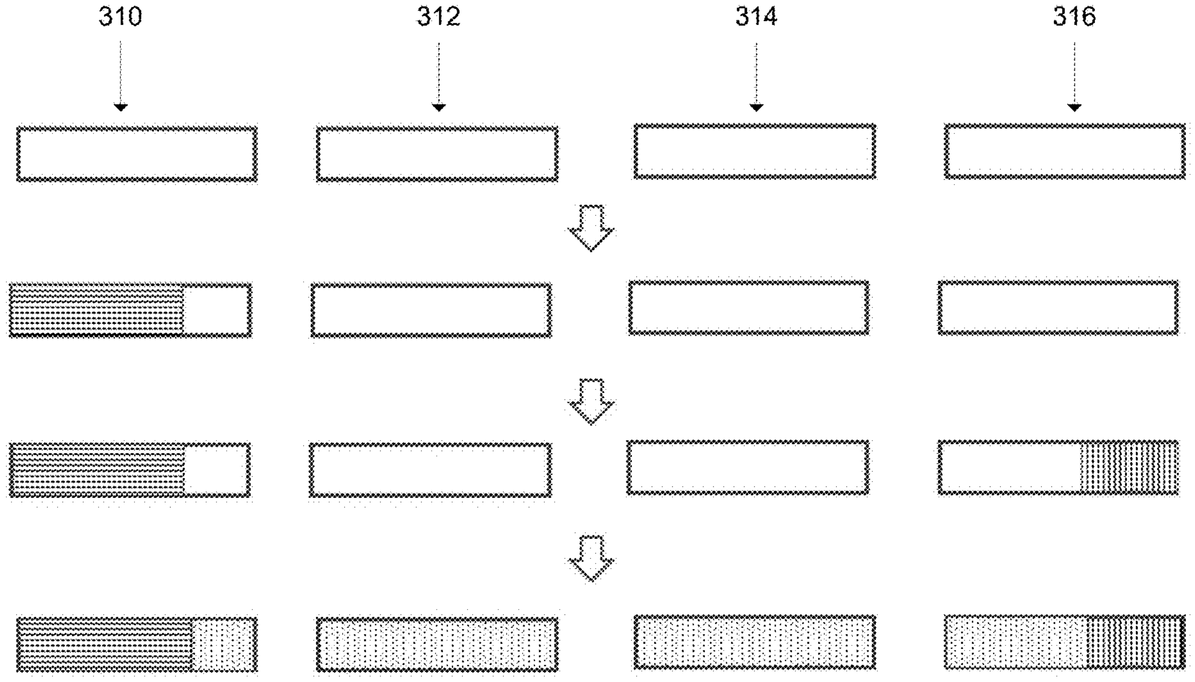
FIG. 3B depicts the process of assigning degree bit types to different modulation classes of a 256-QAM modulation in accordance with an exemplary embodiment of the disclosure.
Figure 3C:
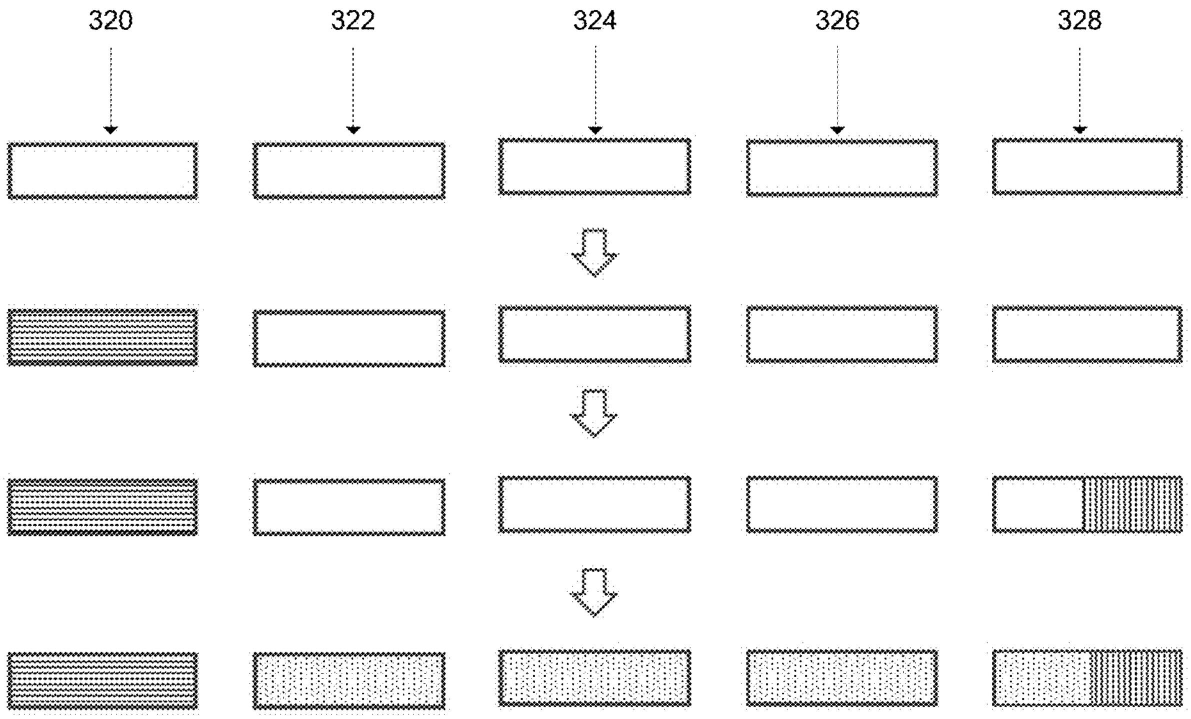
FIG. 3C depicts the process of assigning degree bit types to different modulation classes of a 1024-QAM modulation in accordance with an exemplary embodiment of the disclosure.

Refer now to the example embodiments of FIGS. 3A, 3B, and 3C which illustrate the water-filling process wherein bits within a particular LDPC degree class are mapped to different modulation classes. In the example embodiment of FIG. 3A, the degree-10 bits 302 make up the smallest portion of bits. In various embodiments, the degree-10 bits 302 are more reliable. In various embodiments, the degree-3 bits 304 make up the largest portion of bits. In various embodiments, the degree-3 bits 304 are the next most reliable. In various embodiments, the degree-2 bits 306 make up a moderate portion of the bits. In various embodiments, the degree-2 bits 306 are the least reliable bits. In various embodiments, these parity check bits are allocated to the degree-2 bits 306. In other embodiments of the disclosure, an irregular LDPC code may have more than three degree classes or may have fewer than three degree classes. In most embodiments, the water-filling process starts from the two ends of the modulation classes, with the sign bit class receiving the maximum number of lowest degree bits, and the lowest amplitude class receiving the maximum number of maximum degree bits to the extent possible.

Refer now to the example embodiment of FIG. 3B which depicts the process of allocating the different degree bits to the different modulation classes of a 256-QAM modulation format. In various embodiments, a 256-QAM modulation format has 4 different bit modulation classes, a first bit modulation class 310, a second bit modulation class 312, a third bit modulation class 314, and a fourth bit modulation class 316. In various embodiments, each bit modulation class has the same number of bits. In various embodiments, the first bit modulation class (the sign class) 310 is the most significant bit modulation class and the most reliable bit modulation class. In various embodiments, each subsequent bit modulation class is a less significant bit class, and a less reliable bit modulation class. In various embodiments, the degree-2 bits 306 are assigned to the first bit modulation class 310. In various embodiments, the degree-2 bits 306 are assigned to the entirety of the first modulation class 310. In various embodiments, the degree-2 bits 306 are assigned to only a portion of the first modulation class 310. In various embodiments, the degree-10 bits 302 are then assigned to the fourth bit modulation class 316. In various embodiments, the degree-10 bits 302 are assigned to the entirety of the fourth bit modulation class 316. In various embodiments, the degree-10 bits 302 are assigned to only a portion of the fourth bit modulation class 316.

In various embodiments, the degree-3 bits 304 are assigned to the remaining bit modulation classes. In various embodiments, the degree-3 bits 304 are assigned to a portion of the first modulation class 310, a portion of the fourth bit modulation class 316, and the entirety of the second bit modulation class 312, and the third bit modulation class 314. In various embodiments, the degree-3 bits 304 may be assigned to neither the first bit modulation class 310 nor the fourth bit modulation class 316. In various embodiments, the degree-3 bits 304 may be assigned to only portions of the second bit modulation class 312 and the third bit modulation class 314. In various embodiments, the degree-3 bits 304 may be assigned to one of the second bit modulation class 312 or third bit modulation class 314. In various embodiments, the different types of degree bits may be assigned in various orders to the different bit modulation classes. In various embodiments, additional degree bit classes may be available. In various embodiments, the additional degree bit classes with greater reliability will occupy the less reliable bit modulation classes, and the additional degree bit classes with less reliability will occupy the more reliable bit modulation classes.

Refer now to the example embodiment of FIG. 3C which depicts the process of allocating the different degree bits to the different modulation classes of a 1024-QAM modulation. In various embodiments, a 1024-QAM modulation has a first bit modulation class 320, a second bit modulation class 322, a third bit modulation class 324, a fourth bit modulation class 326, and a fifth bit modulation class 328. In various embodiments, each bit modulation class has the same proportion of bits. In various embodiments, the first bit modulation class 320 is the most significant bit modulation class and the most reliable bit modulation class. In various embodiments, each subsequent bit modulation class is a less significant bit modulation class, and a less reliable bit modulation class. In various embodiments, the degree-2 bits 306 are assigned to the first bit modulation class 320. In various embodiments, the degree-2 bits 306 are assigned to the entirety of the first bit modulation class 320. In various embodiments, the degree-2 bits 306 are assigned to only a portion of the first bit modulation class 320. In various embodiments, the degree-10 bits 302 are assigned to the fifth bit modulation class 328. In various embodiment the degree-10 bits 302 are assigned to the entirety of the fifth bit modulation class 328. In various embodiments, the degree-10 bits 302 are assigned to only a portion of the bit fifth bit modulation class 328. In various embodiments, the degree-3 bits 304 are assigned to the remaining bit modulation classes. In various embodiments, the degree-3 bits 304 are assigned to a portion of the fifth bit modulation class 328, and the entirety of the second bit modulation class 322, the third bit modulation class 324, and the fourth bit modulation class 326. In various embodiments, the degree-3 bits 304 are also assigned to a portion of the first bit modulation class 320.

In various embodiments, the degree-3 bits 304 are not assigned to any of the fifth bit modulation class 328. In various embodiments, the degree-3 bits 304 are assigned to only one or two of the second bit modulation class 322, the third bit modulation class 324, or the fourth bit modulation class 326. In various embodiments, the degree-3 bits 304 are assigned to only portions of the second bit modulation class 322, the third bit modulation class 324, or the fourth bit modulation class 326. In various embodiments, the different types of degree bits may be assigned in various orders to the different bit modulation classes. In various embodiments, additional degree bit classes may be available. In various embodiments, the additional degree bit classes with greater reliability will occupy the less reliable bit modulation classes, and the additional degree bit classes with less reliability will occupy the more reliable bit modulation classes.

The performance of various embodiments was evaluated using Monte Carlo simulations to evaluate the FEC threshold (SNR level, or equivalently, the pre-FEC bit error rate for which no errors are observed), and the average number of iterations the BP decoder takes to converge a given SNR. Comparing these metrics for QPSK with that for higher order M-QAM provides the evidence of the benefit of the proposed bit mapping scheme. In one decoder set-up, we observe a FEC threshold of ~4.35% for QPSK, ~4.50% for 16-QAM, and ~4.55% for 64-QAM, with the improvement mostly being attributable to the bit mapping scheme for some embodiments.

Figure 4A:
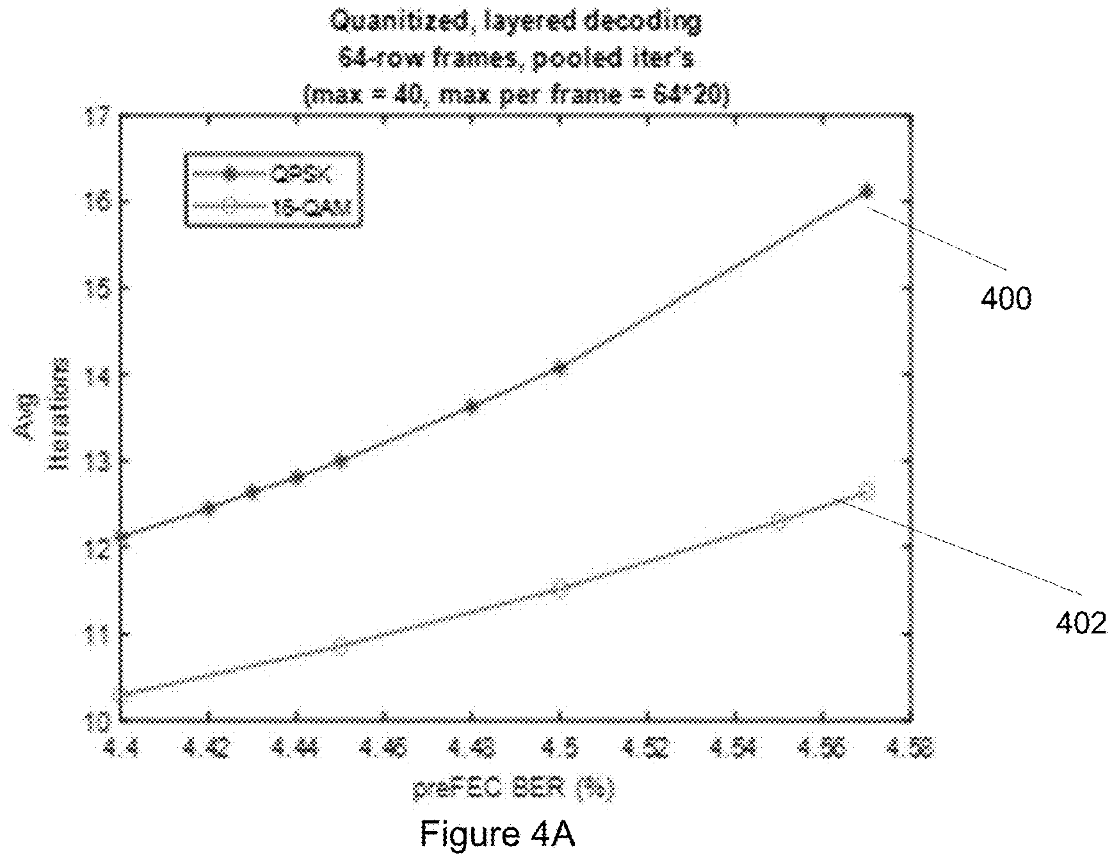
FIG. 4A is a graph comparing the average number of iterations necessary for decoding an LDPC code word according to an exemplary embodiment of the present disclosure comparing the use of QPSK versus 16-QAM modulation formats in accordance with an exemplary embodiment of the disclosure.

Refer now to the example embodiment of FIG. 4A. FIG. 4A shows the average number of iterations as a function of pre-FEC channel BER for a LDPC code in QPSK and 16-QAM. The QPSK 400 has no different modulation bit classes. The 16-QAM 402 has different modulation bit classes that have been allocated in accordance with the present disclosure. FIG. 4A shows a significant improvement from QPSK 400 to 16-QAM 402 in convergence time (up to 25%) at all noise levels. This benefit is maintained, in various embodiments, which utilize various decoder parameters such as message quantization levels, number of decoding layers, approximations to message computations, and others. The advantage of the present disclosure is indicated by the reduction in iterations from QPSK to 16-QAM. In some embodiments, the mapping described herein results in increased efficiencies in comparison with the work expended using QPSK without a mapping.

Figure 4B:
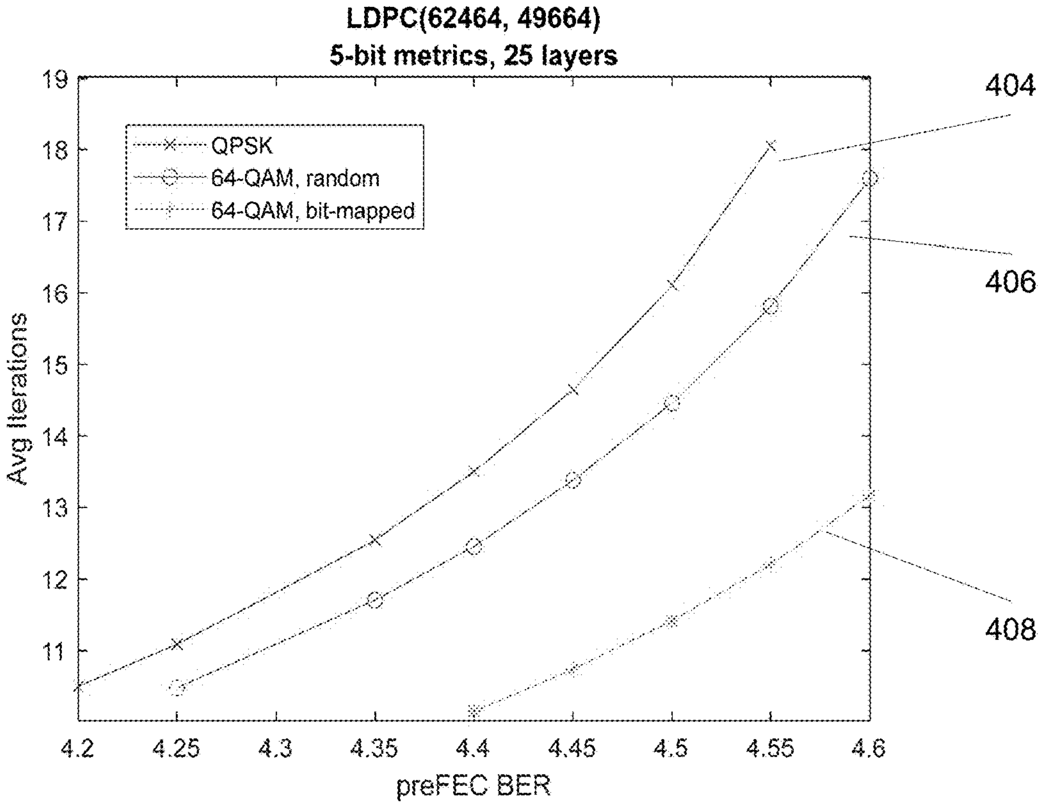
FIG. 4B is a graph comparing the average number of iterations necessary for decoding a LDPC code word according to an exemplary embodiment of the present disclosure comparing the use of QPSK versus 64-QAM LDPC modulation formats, and random versus water-filling bit-mapping in accordance with an exemplary embodiment of the disclosure.

Refer now to the example embodiment of FIG. 4B. FIG. 4B shows the average number of iterations as a function of pre-FEC channel BER for an LDPC code using QPSK, and 64-QAM with random bit allocations 406 and with the bit-mapped 64-QAM allocations 408 in accordance with the present disclosure. The graph shows an improvement between the QPSK 404 and 64-QAM with random bit allocations 406. However, there is a greater decrease in the number of required iterations moving from the 64-QAM with random bit allocations 406 to the bit-mapped 64-QAM allocations 408 implementing a mapping disclosed herein. The system utilizing the bit-mapped 64-QAM is the most efficient.

By utilizing this bit mapping scheme in accordance with the present disclosure in 16-QAM, 64-QAM, and other 222-QAM, fewer iterations are necessary. This decreases both power consumption and the time needed to transmit the data reliably. For two-dimensional rectangular modulation formats with M=22n+1 such as 8-QAM, 32-QAM, 128-QAM, etc., the bit mapping scheme can be applied, as is, to the modulation bit classes implied by these non-square QAM constellations. For example, 32-QAM will have an 8×4 rectangular constellation with three different modulation classes, not all equally populated. The water-filling process such as described relative to FIGS. 3A, 3B, and 3C would proceed as before but with three buckets of sizes 2Q, 2Q and Q. For more general QAM constellations with a nonrectangular and/or non-uniform grid, the disclosed bit-mapping scheme, systems, and methods is still applicable with the implied modulation bit classes of varying sizes.

In some embodiments, the high quality degree bits, the intermediate quality degree bits, and the low quality degree bits are assigned to the n modulation classes through a water filling process. In many embodiments, as many of the highest quality degree bits as possible are assigned to a plurality of the lowest quality modulation classes, as many of the lowest quality degree bits as possible are assigned to the highest quality modulation classes, and any intermediate quality degree bits are assigned to the remaining modulation classes in an order that matches low quality degree with high quality modulation and vice versa. In some embodiments, the modulator has a M-ary QAM modulation structure. In various embodiments, the M-ary QAM modulation structure is a 16-QAM modulation structure wherein there are n=2 modulation classes, a high quality modulation class and a low quality modulation class.

In some embodiments, as many of the high quality degree bits as possible are assigned to the low quality modulation class. In many embodiments, as much of the low quality degree bits as possible are assigned to the high quality modulation class. In some embodiments, the one or more intermediate quality degree bits are assigned to the remaining high quality modulation class and the remaining low quality modulation class. In various embodiments, the M-ary QAM modulation structure is a 64-QAM modulation structure wherein there are n=3 modulation classes, a high quality modulation class, one intermediate quality modulation class, and a low quality modulation class.

In many embodiments, the three modulation classes are a sign class, first amplitude class, and second amplitude class. In some embodiments, as many high quality degree bits as possible are assigned to the low quality modulation class and as many of the low quality degree bits as possible are assigned to the high quality modulation class. In various embodiments, the intermediate quality degree bits are assigned to the intermediate quality bit modulation class, the remaining high quality modulation class, and the remaining low quality modulation class. In some embodiments, the parity check bits occupy the low quality degree bits assigned to the high quality modulation class. In many embodiments, there are at least four types of degree bits.

In part, in yet another aspect, the disclosure relates to a method for allocating different quality degree bits to different quality modulation bits. The method may include providing a Gray mapping of a 64-QAM code word wherein the Gray mapping has two different modulation classes, a plurality of first amplitude modulation bits, a plurality of second amplitude modulation bits and a plurality of sign modulation bits wherein the sign modulation bits are less likely to be in error than the first amplitude modulation bits and the first modulation bits are less likely to be in error than the second amplitude modulation bits; providing an irregular LDPC code having a plurality of degree-2 bits, a plurality of degree-3 bits and a plurality of degree-10 bits; mapping the degree-10 bits to the second amplitude modulation bits; mapping the degree-2 bits to the sign modulation bits; and mapping the degree-3 bits to a plurality of remaining modulation bits. In part, in another aspect, the disclosure relates to one or more parity check bits that occupy the degree-2 bits that are assigned to the sign modulation bits.

In part, the disclosure relates to a method for allocating different quality degree bits to different quality modulation bits. The method may include providing a mapping of a code word, such as a M-QAM code word, wherein the mapping has two different modulation classes, a plurality of amplitude modulation bits and a plurality of sign modulation bits wherein the sign modulation bits have a first error rate, wherein the amplitude modulation bits have a second error rate, wherein the second error rate is greater than the first; providing a code having a plurality of bits, wherein one or more bits of the plurality of bits have degrees; mapping a first set of one or more bits of the plurality of bits to the amplitude modulation bits; mapping a second set of one or more bits of the plurality of bits to the sign modulation bits; and mapping a third set of one or more bits of the plurality of bits to a plurality of remaining modulation bits. In some embodiments, one or more parity check bits occupy the lowest degree class that are assigned to the sign modulation bits.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, encoders, decoders, modulators, interleavers, mapping devices, bit mappers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit." "module." or "system." Furthermore, embodiments may take the form of a computer program product embodied in one or more computer readable medium(s) having computer readable program code embodied thereon.

What is claimed is:

1. A method for bit mapping codes comprising:

providing a modulator with n modulation classes where n is an integer value of two or more;

receiving a code defined at least in part by at least a high quality degree class, Y intermediate quality degree classes and a low quality degree class, wherein Y is 0 or a positive integer;

assigning bits to the n modulation classes using a water filling process;

generating, using the modulator, a modulated waveform; and transmitting the modulated waveform.

2. The method of claim 1, wherein as many highest quality degree bits as possible are assigned to a plurality of lowest quality modulation classes, as many lowest quality degree bits as possible are assigned to highest quality modulation classes, and any intermediate quality degree bits are assigned to any remaining modulation classes in an order that matches low quality degree with high quality modulation.

3. The method of claim 1, wherein the modulator has a M-ary QAM modulation structure.

4. The method of claim 3, wherein the M-ary QAM modulation structure is a 16-QAM modulation structure wherein there are n=2 modulation classes, a high quality modulation class and a low quality modulation class.

5. The method of claim 4, wherein assigning the bits comprises assigning high quality degree bits, intermediate quality degree bits, and low quality degree bits to the n modulation classes, wherein as many of the high quality degree bits as possible are assigned to the low quality modulation class.

6. The method of claim 5, wherein as many of the low quality degree bits as possible are assigned to the high quality modulation class.

7. The method of claim 6, wherein the intermediate quality degree bits are assigned to any remaining high quality modulation class and any remaining low quality modulation class.

8. The method of claim 3, wherein the M-ary QAM modulation structure is a 64-QAM modulation structure wherein there are n=3 modulation classes, a high quality modulation class, one intermediate quality modulation class, and a low quality modulation class.

9. A method for bit mapping codes comprising:

providing a modulator with n modulation classes, wherein the modulator has a M-ary QAM modulation structure that is a 64-QAM modulation structure wherein there are n=3 modulation classes, a high quality modulation class, one intermediate quality modulation class, and a low quality modulation class, and wherein the n=3 modulation classes are a sign class, first amplitude class, and second amplitude class;

receiving a code defined at least in part by a high quality degree class, Y intermediate quality degree classes and a low quality degree class, wherein Y is 0 or a positive integer;

assigning bits to the n=3 modulation classes;

generating, using the modulator, a modulated waveform; and transmitting the modulated waveform.

10. The method of claim 8, wherein as many high quality degree bits as possible are assigned to the low quality modulation class and as many of low quality degree bits as possible are assigned to the high quality modulation class.

11. The method of claim 10, wherein any intermediate quality degree bits are assigned to an intermediate quality bit modulation class, any remaining high quality modulation class, and any remaining low quality modulation class.

12. The method of claim 8, wherein parity check bits occupy low quality degree bits assigned to the high quality modulation class.

13. The method of claim 1, wherein there are at least four types of degree bits.

14. A modulation system comprising:

a modulator with n modulation classes where n is an integer value of two or more;

an encoder configured to provide a code defined at least in part by a high quality degree class, Y intermediate quality degree classes and a low quality degree class, wherein Y is 0 or a positive integer; and a mapper configured to:

receive the code; and assigning bits to the n modulation classes of the modulator using a water filling process;

wherein the modulator is configured to generate a modulated waveform based on the assigned bits.

15. The modulation system of claim 14, wherein as many highest quality degree bits as possible are assigned to a plurality of lowest quality modulation classes, as many lowest quality degree bits as possible are assigned to highest quality modulation classes, and any intermediate quality degree bits are assigned to any remaining modulation classes in an order that matches low quality degree with high quality modulation.

16. The modulation system of claim 14, wherein the modulator has a M-ary QAM modulation structure.

17. The modulation system of claim 16, wherein the M-ary QAM modulation structure is a 64-QAM modulation structure, wherein there are n=3 modulation classes, a high quality modulation class, one intermediate quality modulation class, and a low quality modulation class.

18. The modulation system of claim 17, wherein the n=3 modulation classes are a sign class, first amplitude class, and second amplitude class.

19. The modulation system of claim 14, wherein as many high quality degree bits as possible are assigned to the low quality modulation class and as many of low quality degree bits as possible are assigned to the high quality modulation class, and wherein any intermediate quality degree bits are assigned to an intermediate quality bit modulation class, any remaining high quality modulation class, and any remaining low quality modulation class.

* * * * *